United States Patent
Yu et al.

(10) Patent No.: US 11,448,949 B2
(45) Date of Patent: Sep. 20, 2022

(54) PROJECTION SYSTEM AND PROJECTION DISPLAY METHOD

(71) Applicant: Appotronics Corporation Limited, Shenzhen (CN)

(72) Inventors: Xin Yu, Shenzhen (CN); Fei Hu, Shenzhen (CN); Chao Wu, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 59 days.

(21) Appl. No.: 17/277,884

(22) PCT Filed: May 15, 2019

(86) PCT No.: PCT/CN2019/086925
§ 371 (c)(1),
(2) Date: Mar. 19, 2021

(87) PCT Pub. No.: WO2020/057150
PCT Pub. Date: Mar. 26, 2020

(65) Prior Publication Data
US 2022/0146921 A1  May 12, 2022

(30) Foreign Application Priority Data
Sep. 21, 2018 (CN) .................. CN201811109874

(51) Int. Cl.
*G03B 21/20* (2006.01)
*H04N 9/31* (2006.01)

(52) U.S. Cl.
CPC ..... *G03B 21/2013* (2013.01); *G03B 21/2033* (2013.01); *G03B 21/2053* (2013.01); *H04N 9/3164* (2013.01)

(58) Field of Classification Search
CPC .... G03B 21/006; G03B 21/008; G03B 21/28; G03B 21/208; G03B 21/2013;
(Continued)

(56) References Cited

U.S. PATENT DOCUMENTS

| | | |
|---|---|---|
| 2003/0147051 A1 | 8/2003 | Fujita et al. |
| 2005/0128436 A1* | 6/2005 | Matsui .................. H04N 9/315 |
| | | 353/31 |

(Continued)

FOREIGN PATENT DOCUMENTS

| | | |
|---|---|---|
| CN | 85106901 A | 11/1986 |
| CN | 1181815 A | 5/1998 |

(Continued)

OTHER PUBLICATIONS

International Search Report dated Jul. 26, 2019, Application No. PCT/CN2019/086925.

(Continued)

*Primary Examiner* — Sultan Chowdhury
(74) *Attorney, Agent, or Firm* — The Dobrusin Law Firm, PC

(57) ABSTRACT

A projection system, comprising a first light source which is an array light source, the first light source being divided into a plurality of illumination areas, and each illumination area may be independently controllable so as to generate a first illumination light field of which the brightness and darkness may be modulated; a second light source comprises an illumination unit and a light steering unit; the light steering unit redistributes illumination light emitted from the illumination unit to generate a second illumination light field of which the brightness and darkness may be modulated, wherein the first and second illumination light fields overlap to generate a combined light field. Also provided is a projection display method. The goal of simultaneously (Continued)

increasing image peak value brightness and lowering image dark field brightness is achieved, and a projection system that has a high contrast ratio is thus obtained.

20 Claims, 10 Drawing Sheets

(58) Field of Classification Search
CPC ............ G03B 21/2033; G03B 21/2053; G03B 21/2066; H04N 9/3111; H04N 9/3141; H04N 9/3155; H04N 9/3161; H04N 9/3164; H04N 9/3182
See application file for complete search history.

(56) References Cited

U.S. PATENT DOCUMENTS

| | | | | |
|---|---|---|---|---|
| 2012/0188469 A1* | 7/2012 | Fukui | ................ | G03B 21/2073 349/5 |
| 2014/0043352 A1 | 2/2014 | Damberg et al. | | |
| 2017/0018215 A1* | 1/2017 | Black | ..................... | H05B 47/00 |
| 2017/0078629 A1 | 3/2017 | Kozak et al. | | |

FOREIGN PATENT DOCUMENTS

| | | |
|---|---|---|
| CN | 104980721 A | 10/2015 |
| CN | 107113409 A | 8/2017 |
| JP | 2000310823 A | 11/2000 |
| JP | 2010152393 A | 7/2010 |
| JP | 2017182083 A | 10/2017 |
| WO | 2018025474 A1 | 2/2018 |
| WO | 2018064374 | 4/2018 |

OTHER PUBLICATIONS

Chinese First Office Action dated Mar. 16, 2021, Application No. 201811109874.5.
Chinese First Search Report dated Nov. 10, 2021, Application No. 201811109874.5.
Extended European Search Report dated Feb. 7, 2022, Application No. 19861754.0.

* cited by examiner

S601

```
┌─────────────────────────────────────────────────────────┐
│ Determining light dimming region and light increasing   │
│ region of light steering unit according to pixel        │── S701
│ gray-scale signal of image frame and maximum brightness │
│ of first light source                                   │
└─────────────────────────────────────────────────────────┘
                          ↓
┌─────────────────────────────────────────────────────────┐
│ Generating brightness distribution signal of            │
│ illumination region of first light source according to  │── S702
│ pixel gray-scale signal of image frame, maximum         │
│ brightness of first light source, and retention         │
│ brightness of light dimming region of light steering    │
│ unit                                                    │
└─────────────────────────────────────────────────────────┘
```

```
┌─────────────────────────────────────────────────────────┐
│ First light source brightness control module is         │
│ configured to generate prepositive brightness           │── S801
│ distribution signal according to pixel gray-scale       │
│ signal of image frame and maximum brightness of first   │
│ light source                                            │
└─────────────────────────────────────────────────────────┘
                          ↓
┌─────────────────────────────────────────────────────────┐
│ Calculate difference between prepositive brightness     │
│ distribution signal and retention brightness of light   │── S802
│ dimming region of light steering unit to obtain         │
│ brightness distribution signal of first light source    │
└─────────────────────────────────────────────────────────┘
```

FIG. 8

PROJECTION SYSTEM AND PROJECTION DISPLAY METHOD

TECHNICAL FIELD

The present disclosure relates to the field of optical imaging technology, and, in particular, to a projection system and a projection display method.

BACKGROUND

An HDR (high dynamic range) projection system may increase contrast and peak brightness output by a projector, so that a bright field and a dark field of an image may render rich information of grayscale, thereby greatly improving graphic effect and viewing experience. Existing projection systems adopt two manners to achieve high dynamic range. In a first manner, a the projection system in prior art controls light emitted from a light source to achieve high dynamic range display effect by using two spatial light modulators which are connected in series. However, the current HDR projection system with two spatial light modulators has a general problem of low light efficiency due to addition of one spatial light modulator. Light efficiency of such a projection system is about 36% of that of an ordinary projection system. It is difficult for the projection system having lower light efficiency to achieve a higher peak brightness. A second manner is to use two projection systems, one projection system displays a standard contrast image, and the other one displays high-brightness components to increase brightness of a highlight part so as to display with a high peak brightness. However, a minimum brightness of black field that may be achieved in an image is limited by the projector that produces a standard contrast image, so that brightness of black field of the projection system using this technology is still very high, thereby reducing contrast and viewing experience.

SUMMARY

In view of this, the present disclosure provides a projection system and a projection display method which may overcome the above-mentioned problems.

In one aspect, a projection system is provided. The projection system includes: a first light source, wherein the first light source is an array light source, the first light source is divided into a plurality of illumination regions, and each of the plurality of illumination regions is separately controllable so that the first light source generate a first illumination light field with adjustable brightness; a second light source, wherein the second light source includes a light-emitting unit and a light steering element, the light steering element is configured to redistribute illumination light emitted by the light-emitting unit to generate a second illumination light field with adjustable brightness, and the second illumination light field superimposes the first illumination light field to generate a combined light field; a processing unit, wherein software modules executed by the processing unit include: a first light source brightness controlling module configured to generate a brightness distribution signal corresponding to the illumination regions of the first light source at least according to a pixel gray scale signal of an image frame to be projected and a maximum brightness of the first light source, and output the brightness distribution signal to the illumination regions of the first light source, to generate the first illumination light field; and a second light source brightness controlling module configured to generate a brightness distribution signal for controlling the light steering element according to the pixel gray scale signal of the image frame and the brightness distribution signal corresponding to the illumination regions of the first light source, to control the light steering element to generate the second illumination light field; and a spatial light modulator, wherein the spatial light modulator is configured to modulate the combined light field according to an image signal output by the processing unit to generate image light carrying image information.

In another aspect, a projection display method is provided. The projection display method includes: generating a brightness distribution signal corresponding to a plurality of illumination regions of a first light source at least according to a pixel gray scale signal of an image frame to be projected and a maximum brightness of the first light source, and outputting the brightness distribution signal to the plurality of illumination regions of the first light source, to generate a first illumination light field; generating a brightness distribution signal for controlling a light steering element according to the pixel gray scale signal of the image frame and the brightness distribution signal corresponding to the plurality of illumination regions of the first light source, to control the light steering element to generate a second illumination light field; combining the first illumination light field with the second illumination light field to generate a combined light field; and illuminating a spatial light modulator using the combined light field, so that the spatial light modulator outputs image light carrying image information under control of an image signal corresponding to the image frame.

Compared with the related art, in the projection system and projection display method provided by the present disclosure, since the first light source can generate the first illumination light field, the first illumination light field includes the light sources arranged in an array, brightness of each illumination regions of the first light source can be separately controllable, so as to generate the first illumination light field with bright-dark distribution and being adjustable according to the content of the image. The first illumination light field can reduce the brightness of the dark field part of the image as needed, thereby increasing the contrast of the projection system. The second light source can also generate the second illumination light field with bright-dark distribution and being adjustable through the light steering technology. The light steering technology can increase the brightness of the bright field of the image, thereby increasing the color level and brightness of the bright field part. The first illumination light field and the second illumination light field are combined in front of the spatial light modulator so as to generate a combined illumination light field illuminating the spatial light modulator, so that the purpose of increasing the peak brightness of the image while reducing the brightness of the black field of the image is achieved, thereby obtaining a projection system having high-contrast.

BRIEF DESCRIPTION OF DRAWINGS

FIG. 7 is a sub-flowchart of the method shown in FIG. 6.

FIG. 8 is a sub-flowchart of the method shown in FIG. 7.

The following embodiments will further illustrate the present disclosure in conjunction with the above drawings.

DESCRIPTION OF EMBODIMENTS

In order to be able to better understand the above objectives, features and advantages of the present disclosure, the present disclosure will be described in detail below with reference to the accompanying drawings and specific embodiments. It should be noted that, in the case of no conflict, the embodiments of the present disclosure and the features in the embodiments may be combined with each other.

In the following description, many details are set forth in order to fully understand the present disclosure. The described embodiments are only some embodiments of the present disclosure, rather than all of them. Based on the embodiments of the present disclosure, all other embodiments obtained by those skilled in the art without creative work shall fall within the protection scope of the present disclosure.

Unless otherwise defined, all technical and scientific terms used herein have the same meaning as commonly understood by those skilled in the technical field of the present disclosure. The terminology used in the specification of the present disclosure herein is only for the purpose of describing embodiments, and is not intended to limit the present disclosure.

Figure 1:
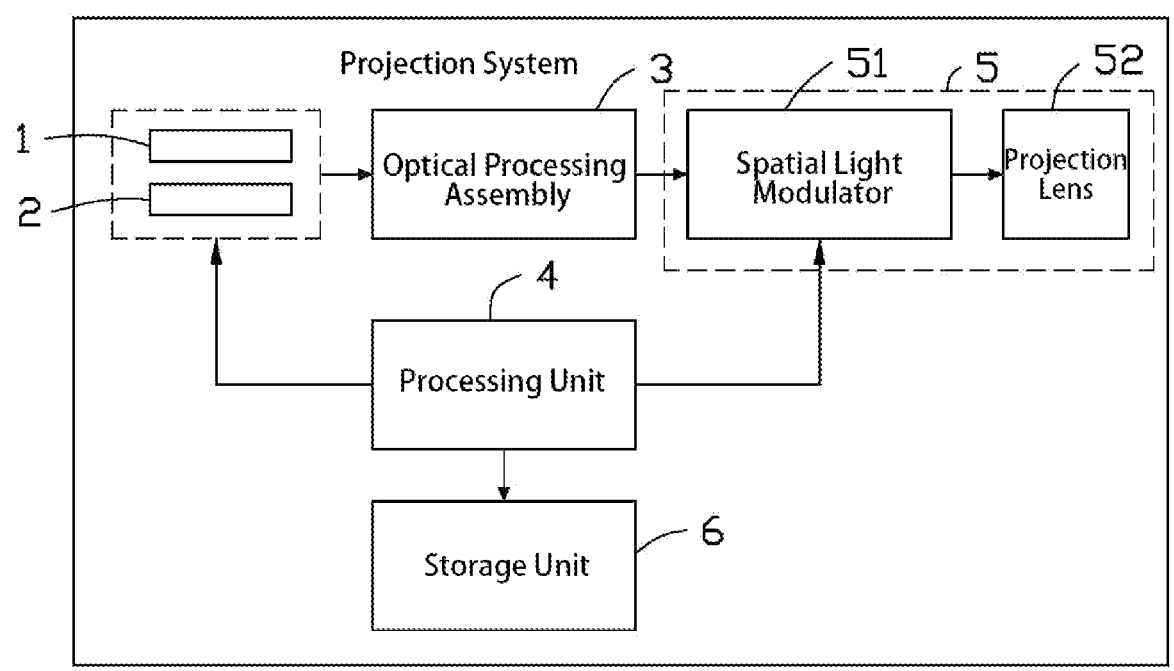
FIG. 1 is a block diagram of an HDR projection system according to an embodiment of the present disclosure.
Figure 2:
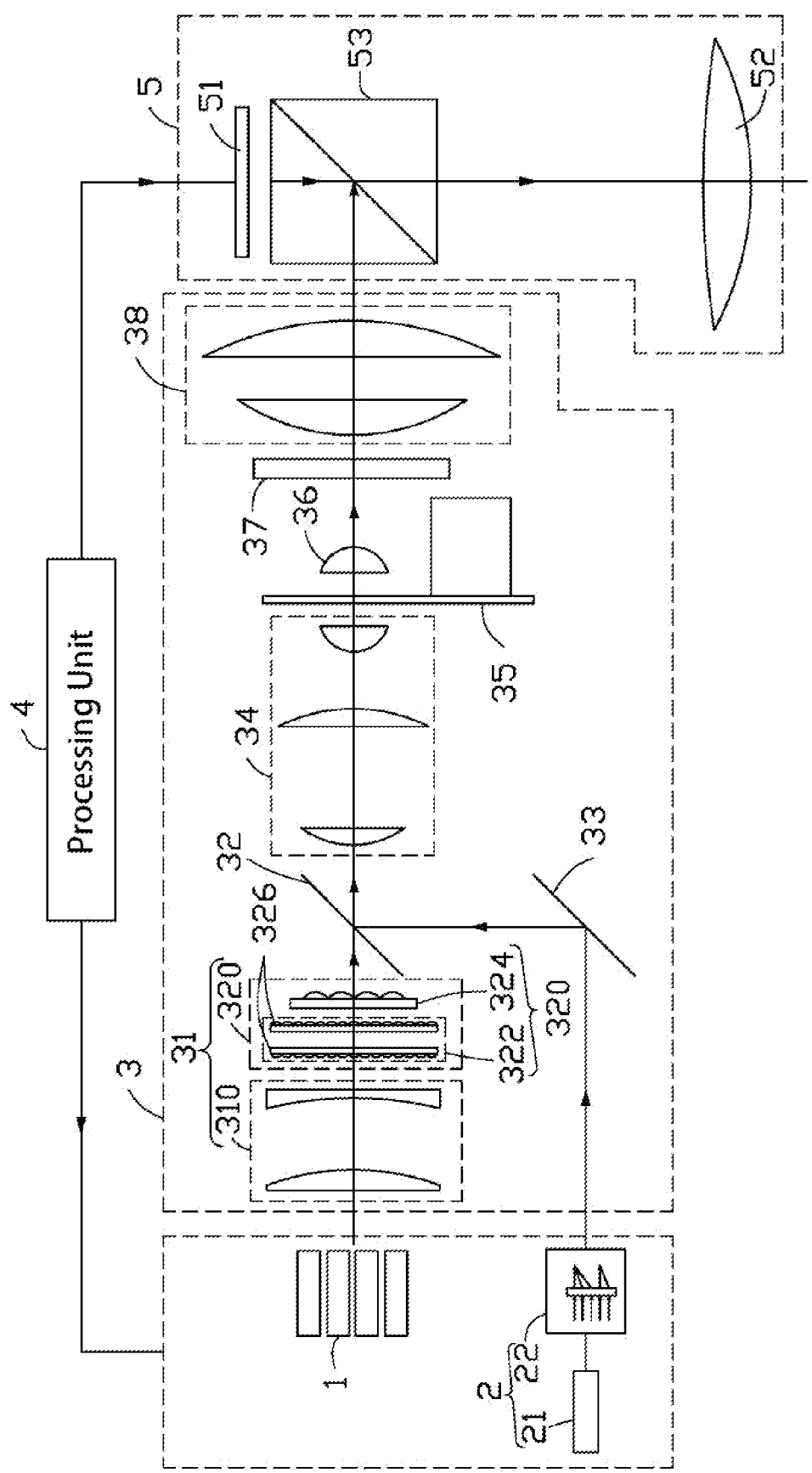
FIG. 2 is a structural schematic diagram of an optical path of the projection system shown in FIG. 1.

Referring to FIGS. 1-2, FIG. 1 is a block diagram showing an HDR projection system according to an embodiment of the present disclosure, and FIG. 2 is a structural schematic diagram of an optical path of the projection system shown in FIG. 1. A projection system 100 includes a first light source 1, a second light source 2, an optical processing assembly 3, a processing unit 4, an imaging system 5 and a storage unit 6. The imaging system 5 further includes a spatial light modulator 51 and a projection lens 52.

The first light source 1 includes a plurality of illumination regions, each of the illumination regions may be separately controllable, so that the first light source 1 may generate a first illumination light field with a bright-dark distribution. The second light source 2 generates a second illumination light field with a bright-dark distribution. The optical processing assembly 3 is configured to combine the first illumination light field and the second illumination light field so as to generate a combined light field for illuminating the spatial light modulator 51. The processing unit 4 is electrically connected to the first light source 1, the second light source 2 and the spatial light modulator 51. The processing unit 4 is configured to generate a first brightness distribution signal corresponding to the illumination regions of the first light source 1 and a second brightness distribution signal corresponding to the second light source 2 according to a pixel gray scale signal of a frame of image and a maximum brightness of the first light source, and output the first brightness distribution signal and the second brightness distribution signal to the first light source 1 and the second light source 2, respectively. Further, the processing unit 4 is also configured to compensate the image signal output to the spatial light modulator 51 according to the total brightness distribution after the first and second illumination light fields are combined, so as to generate an image with correct grayscale and color. The projection lens 52 is configured to project the image light modulated by the spatial light modulator 51 onto a projection screen.

Details may be referred to the specific optical path of the projection system 100 illustrated in FIG. 2.

The first light source 1 includes a light source array formed by a plurality of sub-light sources. The light source array is arranged in an m×n array according to an aspect ratio of the projection image, and is divided into a plurality of illumination regions. Each illumination regions may include one or more sub-light sources and may be separately controllable. It is appreciated that, in an embodiment of the present disclosure, the sub-light source is a laser device, and the greater the number of sub-light sources used in the first light source 1 is, the more illumination regions the first light source 1 can be divided into. Each illumination region in the light source array is configured to emit light beams. Brightness of each illumination region may be separately controllable. For example, the illumination regions can be controllable by the processing unit 4 to a fully open state, a closed state, or to emit light beams with different brightness. When all the illumination regions of the first light source 1 are in the fully open state, uniform illumination light can be output from the first light source 1. When a plurality of illumination regions emits light beams with different brightness, the first light source 1 outputs the first illumination light field with a bright-dark distribution as an entirety.

The sub-light source of the first light source 1 may be a monochromatic laser light source, an RGB laser light source, a light source in which white light is generated by exciting fluorescent powder or a wavelength conversion device, or RGB primary light source, or a combination of one or more of the light sources listed above. In this embodiment, the sub-light source is a laser device which may excite fluorescent powder to generate a short-wavelength laser light with primary light of different colors, such as a blue laser device.

The second light source 2 includes a light-emitting unit 21 and a light steering element 22 arranged in an optical path of the light-emitting unit 21. In an embodiment of the present disclosure, the light-emitting unit 21 is a uniform illumination light source. For example, the light-emitting unit 21 further includes a light homogenization assembly which forms a uniform illumination light source. The light-emitting unit may be a laser light source, LED light source, a light source in which fluorescent powder is excited by laser light, and the like. The light emitted from the light-emitting unit 21 uniformly illuminates the light steering element 22. The light steering element 22 redistributes illumination light field under control of the processing unit 4, thereby generating an illumination light field with bright-dark distribution while keeping the total luminous flux unchanged or slightly reduced. The light steering element 22 may be a phase modulation liquid crystal or a deformable mirror, and the like. When the light steering element 22 is the phase modulation liquid crystal or the deformable mirror, the light steering element 22 it may modulate phase delay of the liquid crystal or change optical path difference distribution of the light steering element, so that the bright-dark distribution of the illumination light field is changed, thereby generating an illumination light field with a second bright-dark distribution. The illumination light field with the second bright-dark distribution generated by the light steering technology may increase brightness of bright field through the light steering element 22, thereby increasing color level and brightness of the bright field.

It is appreciated that, when the light steering element adopts the phase modulation liquid crystal, the light exited from the light steering element 22 generally has a polarization state due to the polarization-maintaining property of the light steering element 22. Therefore, the first light source 1 having another polarization state may also be used to combine the polarization state with the second light source 2.

For example, the first light source 1 may be selected as a laser device that may emit either one of light having a polarization state A and light having a polarization state B, and the light-emitting unit 21 in the second light source 2 may be selected as another laser device that may emit the other one of light having polarization state A and light having polarization state B. That is, when a polarization state of a light beam emitted from one of the first light source 1 and the light steering element 22 (for example, the first light source 1) is one of polarization state A and polarization state B, a polarization state of a light beam emitted from the other one of the first light source 1 and the light steering element 22 is the other one of polarization state A and polarization state B. Polarization state A and polarization state B are orthogonal polarization states. It is appreciated that polarization state A and polarization state B are one of s-polarization state and p-polarization state, respectively. A light combination device is adopted to reflect light having polarization state B and transmit light having polarization state A, thereby achieving combination of light having polarization state A and light having polarization state B smoothly.

Referring to FIG. 2, in an embodiment shown in FIG. 2, a combined light field is formed by combining the illumination light field generated by the first light source 1 and the illumination light field generated by the second light source 2 in a manner of combining lights through their polarization states.

The first light source 1 is a short-wavelength light source, and emits an excitation light having a short-wavelength polarization state A. The light-emitting unit 21 of the second light source 2 is a short-wavelength light source providing uniform short-wavelength illumination, and the polarization state of the short-wavelength light source is B. The optical processing assembly 3 includes a relay shaping assembly 31, a light combination device 32 located in a light exiting path of the relay shaping assembly 31, a first light steering element 33 located in a light exiting path of the light steering element 22, a first relay lens group 34 located in a light exiting path of the light combination device 32, a wavelength conversion device 35 located in a light exiting path of the first relay lens group 34, a collection relay lens group 36 located in a light exiting path of the wavelength conversion device 35, a scattering element 37 located in a light exiting path of the collection relay lens group 36, and a second relay lens group 38 located in a main light exiting path of the scattering element 37.

In this embodiment, the light combination device 32 may transmit the light having polarization state A and reflect the light having polarization state B. The light combination device 32 may be a dichroic mirror.

In this embodiment, the relay shaping assembly 31 is located in the light exiting path of the first light source 1. The relay shaping assembly 31 includes a light spot compression lens group 310 located in the light exiting path of the first light source 1 and a homogenization assembly 320 in the light exiting path of the light spot compression lens group 310.

The light spot compression lens group 310 is configured to compress an array light spot emitted from the first light source 1 so as to obtain an array light spot having a smaller area, thereby avoiding overlap between the light spots which may cause non-homogeneous light output. The light spot compression lens group 310 may be an array composed of mirrors, or may be an array composed of positive and negative lenses. In this embodiment, the light spot compression lens group 310 includes a plano-convex lens and a plano-concave lens which are located in a light exit direction of the first light source 1. A convex surface of the plano-convex lens is arranged directly opposite to a concave surface of the plano-concave lens.

The light homogenization assembly 320 is configured to homogenize the array light spot exited from the light spot compression lens group 310. In this embodiment, the light homogenization assembly 320 includes a dual fly-eye homogenization lens 322 and a condensing lens array 324 which are sequentially located in the light exiting path of the light spot compression lens group 310. The dual fly-eye homogenization lens 322 includes two fly-eye lenses 326 arranged in symmetry. Each fly-eye lens 326 is arranged in an array formed by a plurality of micro lenses. Two micro lenses of the two fly-eye lenses 326 are arranged facing away from each other. A plurality of micro lenses in two fly-eye lenses 326 has the same shape and are in one-to-one correspondence. A spacing between two fly-eye lenses 326 is equal to a focal length of a single micro lens.

It is appreciated that the discretized light spots generated by the first light source 1 may generate square light spots with a fixed spacing via the dual fly-eye homogenization lens 322. The spacing, size, and shape of the light spots in the light spot array are determined by the focal length, size, and shape of each single lens of the fly-eye lens 326, thereby achieving uniform light output from the first light source 1.

It is appreciated that, in other embodiments, the dual fly-eye homogenization lens 322 may also be a monolithic double-sided fly-eye lens, that is, a plurality of micro lenses is arranged on two opposite surfaces of a monolithic lens.

There is a one-to-one correspondence between each lens in the condensing lens array 324 and each light source in the light source array in the first light source 1, and the condensing lens array 324 also forms an m×n array. An optical axis of each lens in the condensing lens array 324 is parallel to the optical axis of the corresponding light source. The light beams incident on the surface of the condensing lens array 324 is focused by the condensing lens array 324.

In this embodiment, the light beam emitted from the first light source 1 is shaped by the relay shaping assembly 31 and then incident to the light combination device 32. The light beam exited from the light steering element 22 is guided by the first light steering element 33 and then incident to the light combination device 32. In this embodiment, the light combination device 32 includes a first surface (not labeled) and a second surface (not labeled) opposite to the first surface. The light beam emitted from the first light source 1 is transmitted from the first surface of the light combination device 32, and the light beam emitted from the second light source 2 is reflected by the second surface of the light combination device 32. Therefore, the light beam having polarization state A emitted from the first light source 1 and the light beam having polarization state B emitted from the second light source 2 are combined at the light combination device 32, so as to generate a combined illumination light field.

The first relay lens group 34 is composed of one or more convex lenses and/or one or more concave lenses. In this embodiment, the first relay lens group 34 is composed of three plano-convex lenses. The first relay lens group 34 is configured to relay the light spot exited from the light combination device 32 to the wavelength conversion device 35.

In this embodiment, the wavelength conversion device 35 is a transmissive wavelength conversion device. The wavelength conversion device 35 converts at least a portion of the light exited from the first relay lens group 34 into an excited light. The wavelength conversion device 35 includes a substrate and a wavelength conversion layer provided on the substrate. The substrate may drive the wavelength conversion layer to rotate at a constant high speed. The wavelength conversion layer may include fluorescent powder which is capable of generating broad-spectrum light after being excited.

The wavelength conversion layer may be divided into one or more segments, e.g., three segments, four segments, six segments, and so on. Each segment may be provided with one kind of fluorescent powder or scattering powder. Different kinds of fluorescent powder may be configured to convert incident light into visible light of different wavelengths, and the scattering powder may be configured to scatter the incident light. For example, the wavelength conversion layer having three segments may be configured to receive blue laser light (excitation light) and output red visible light, green visible light, and blue visible light in time sequence. The wavelength conversion layer having four segments may be configured to receive blue laser light and output red visible light, green visible light, blue visible light, and yellow visible light in time sequence. The wavelength conversion layer having six segments may be configured to receive blue laser light and output red visible light, green visible light, blue visible light, red visible light, green visible light, and blue visible light in time sequence.

In this embodiment, spatial brightness distribution of the light beams emitted from each light source only changes spatial grayscale distribution of the image light, and does not change color gamut spatial distribution of the image light, thereby ensuring that the intensity distribution of three primary color spaces remains unchanged, so as to ensure color uniformity of a projection image. The wavelength conversion device 35 may be driven to perform circular movement, so that the light spot formed by the light beam on the wavelength conversion layer acts on the wavelength conversion layer along a predetermined path so as to be converted into visible light of different wavelengths or be scattered to a subsequent collection relay lens group 36.

In the embodiment shown in FIG. 2, the wavelength conversion device 35 is provided subsequent to the light combination device 32. If the wavelength conversion device 35 is placed in front of the optical path of the light combination device 32 and after the light beam passes through the wavelength conversion device 35, then polarization state of the light source may not be maintained. Moreover, because light field distribution of the array light source needs to be maintained, it may not be polarized through polarization component having high efficiency such as PCS. The use of absorbing or reflecting polarizers will have a problem of low efficiency. Therefore, the solution of arranging the wavelength conversion device 35 in front of the optical path of the light combination device 32 is not suitable for the case in which laser excitation fluorescence light is used as the array light source, and may only suitable for the case in which pure laser light is used as the array light source.

The collection relay lens group 36 is arranged in the light exiting path of the wavelength conversion device 35. In this embodiment, the collection relay lens group 36 is composed of a convex lens. The collection relay lens group 36 is configured to collect the primary lights converted by the wavelength conversion device 35 and project the primary lights to the scattering element 37.

The scattering element 37 is configured to increase incident angle and soften the edge of incident light spot, so as to realize light homogenization, uniformity of the illumination light field and smoothness at the junction of the array light source. The function of the scattering element 37 is equivalent to applying a Gaussian blur to the light spot exited from the collection relay lens group 36, so that a square light spot with sharp edges is diffused and superimposed on each other in a reserved region to generate a uniform illumination light field, which is homogenized by the scattering element 37, and then projected to the second relay lens group 38.

The second relay lens group 38 is provided in the light exiting path of the scattering element 37. The second relay lens group 38 is composed of one or more convex lenses and/or one or more concave lenses. In this embodiment, the second relay lens group 38 is composed of two plano-convex lenses. The convex surfaces of the two plano-convex lenses are arranged opposite to each other. The first relay lens group 34, the wavelength conversion device 35, the collection relay lens group 36, and the second relay lens group 38 do not change the distribution shape of the light spot projected thereon.

The imaging system 5 is located in the light exiting path of the second relay lens group 38. In this embodiment, in addition to the spatial light modulator 51 and the projection lens 52, the imaging system also includes an optical-mechanical system 53. The optical-mechanical system 53 is located in the light exiting path of the second relay lens group 38. The spatial light modulator 51 and the projection lens 52 are located in the light exiting path of the optical-mechanical system 53. In this embodiment, on one hand, the optical-mechanical system 53 is configured to guide the illumination light from the second relay lens group 38 to the spatial light modulator 51 and, on the other hand, the optical-mechanical system 53 is configured to guide the image light modulated by the spatial light modulator 51 to the projection lens 52. It is appreciated that the spatial light modulator 51 may be a DMD (digital micromirror device), an Lcos (reflective liquid crystal panel), or an LCD.

The optical path structure shown in FIG. 2 is also suitable for combining the first illumination light field and the second illumination light field by means of wavelength combination. When wavelength combination is performed, the first light source 1 and the second light source 2 are short-wavelength light sources having different wavelengths. For example, the first light source 1 adopts blue light of 445 nm, the second light source 2 adopts blue light of 455 nm, and the light combination device 32 is a wavelength selection device. The first illumination light field is combined with the second illumination light field through reflection and transmission. Wavelength combination is not limited to the combination of blue light. For example, the first light source 1 may also adopt a green laser light of 520 nm or a red laser light of 635 nm. The second light source 21 may adopt a green laser light of 532 nm or a red laser light of 655 nm.

In this way, light from the first light source 1 and the second light source 21 may also be combined.

Figure 3:
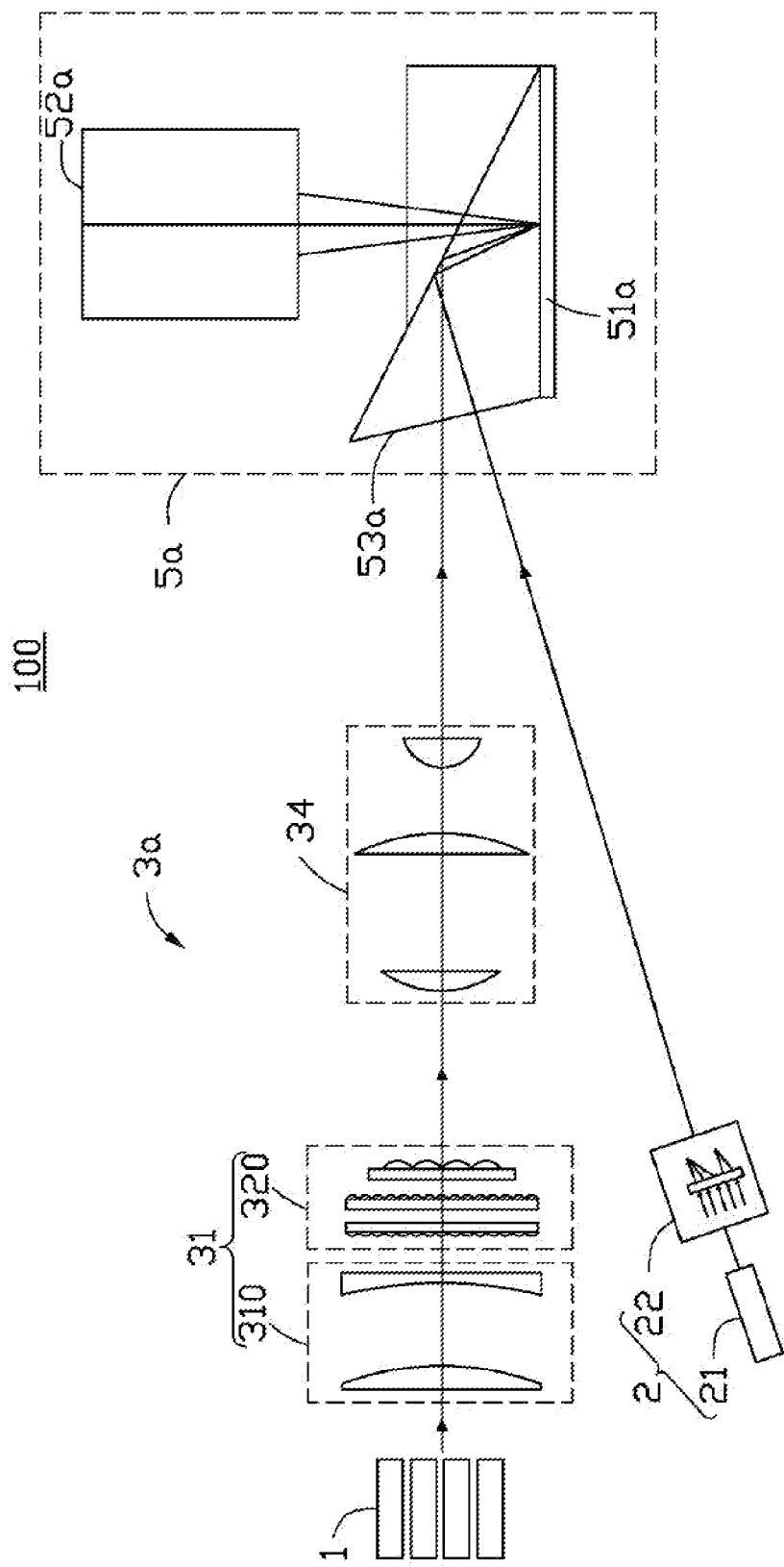
FIG. 3 is a structural schematic diagram of another optical path of the projection system shown in FIG. 1.

Referring to FIG. 3, FIG. 3 shows another optical path structure of the projection system 100. In this embodiment, the illumination light field generated by the first light source 1 and the illumination light field generated by the second light source 2 generate a combined light field by means of spatial combination. Compared with the manner of combining light having different polarization states as shown in FIG. 2, the optical path in this embodiment is simpler. In this embodiment, the projection system 100 includes a first light source 1, a second light source 2, an optical processing assembly 3a, a processing unit 4 (not shown), and an imaging system 5a. The first light source 1 is an array light source including a plurality of illumination regions. The second light source 2 includes a light-emitting unit 21 and a light steering element 22. The optical processing assembly 3a includes a relay shaping assembly 31 located in the light exiting path of the first light source 1, and a first relay lens group 34 located in the light exiting path of the relay shaping assembly 31. The relay shaping assembly 31 includes a light spot compression lens group 310 and a light homogenization assembly 320. The imaging system 5a includes a spatial light modulator 51a, a projection lens 52a, and an optical-mechanical system 53a. In this embodiment, the optical-mechanical system 53a includes a TIR (Total Internal Reflection) prism located in the light exiting path of the first relay lens group 34. The omitted processing unit 4 not shown in the figure is still electrically connected to the first light source 1, the second light source 2, and the spatial light modulator 51a.

Each of the first light source 1 and the second light source 2 adopts a laser light source, which has a small etendue, so that a cone angle of light irradiated on the spatial light modulator 51a may be controlled to be very small. In this embodiment, by selecting a micro-mirror array DMD with a larger deflection as the spatial light modulator 51a and matching with a projection lens 52a with a smaller F-number, the cone angles of the first light source 1 and the second light source 2 may be less than half of the deflection angle of the micro-mirror array and half of the light collection angle of the projection lens 52a, so that the first light source 1 and the second light source 2 may irradiate the spatial light modulator 51a at different angles and may be collected by the projection lens 52a, thereby achieving imaging.

In an embodiment of the present disclosure, the light beam emitted from the first light source 1 is shaped by the relay shaping assembly 31 to obtain a square light spot with a fixed spacing. The square light spot passes through the first relay lens group 34 and then is projected to the total internal reflection prism. The light beam emitted from the second light source 2 and the light beam emitted from the first light source 1 form an acute angle. Therefore, the light beam emitted from the second light source 2 and the light beam emitted from the first light source 1 may both reach the total internal reflection prism, and then are reflected by the total internal reflection prism to reach the spatial light modulator 51a. Under the control of the processing unit 4, the spatial light modulator 51a modulates the incident light. The modulated image light is transmitted through the total internal reflection prism, and finally projected onto a screen by the projection lens 52a.

Figure 4:
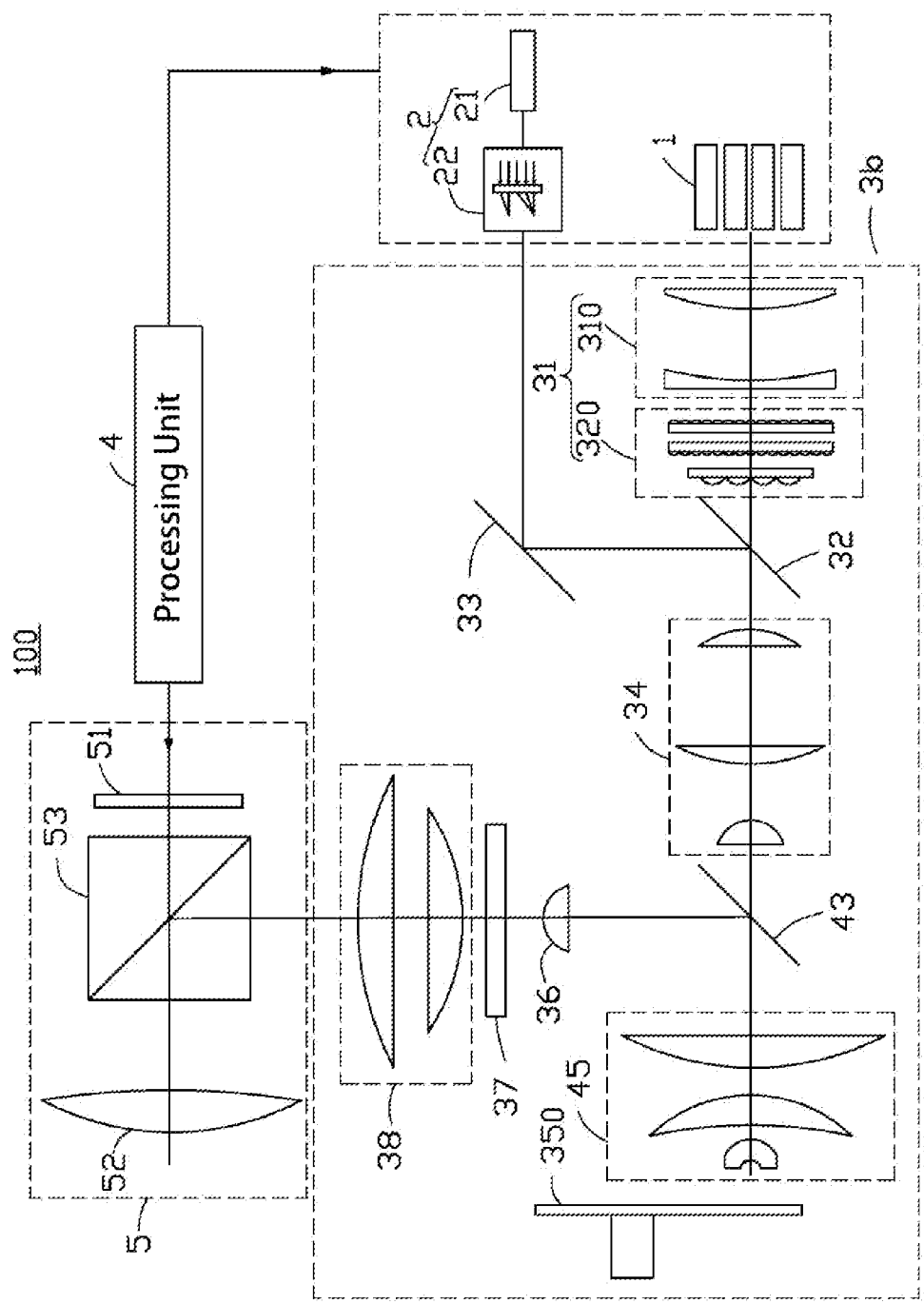
FIG. 4 is a structural schematic diagram of a third optical path of the projection system shown in FIG. 1.

Referring to FIG. 4, FIG. 4 is a structural schematic diagram of a third optical path of the projection system 100. In this embodiment, the optical path of the projection system 100 is basically the same as that shown in FIG. 2. That is, the projection system 100 includes a first light source 1, a second light source 2, an optical processing assembly 3b, a processing unit 4 and an imaging system 5. The optical processing assembly 3b includes a relay shaping assembly 31, a light combination device 32 located in the light exiting path of the relay shaping assembly 31, a first light steering element 33 located in the light exiting path of the light steering element 22, and a first relay lens group 34, a wavelength conversion device 350, a collection relay lens group 36, a scattering element 37, and a second relay lens group 38 that are sequentially arranged along the light exiting path of the light combination device 32. The imaging system 5 includes a spatial light modulator 51, a projection lens 52a, and an optical-mechanical system 53. In this embodiment, the difference between the projection system 100 and the projection system shown in FIG. 2 lies in that, in this embodiment, the wavelength conversion device 350 is a reflective wavelength conversion device, and the projection system 100 further includes a second light steering element 43 and a third relay lens group 45.

The third relay lens group 45 is arranged opposite to the first relay lens group 34. The second light steering element 43 is provided in the optical path between the first relay lens group 34 and the third relay lens group 45. The third relay lens group 45 is composed of one or more convex lenses and/or one or more concave lenses. The light spot of the illumination light field combined from the light combination device 32 passes through the first relay lens group 34, the second light steering element 43, and the third relay lens group 45 and then enters into the wavelength conversion device 350. The light beam exited from the wavelength conversion device 350 passes through the third relay lens group 45, and then is reflected by the second light steering element 43 to be collected by the collection relay lens group 36. The optical path after passing through the collection relay lens group 36 is the same as that shown in FIG. 2, which is not elaborated here.

Figure 5:
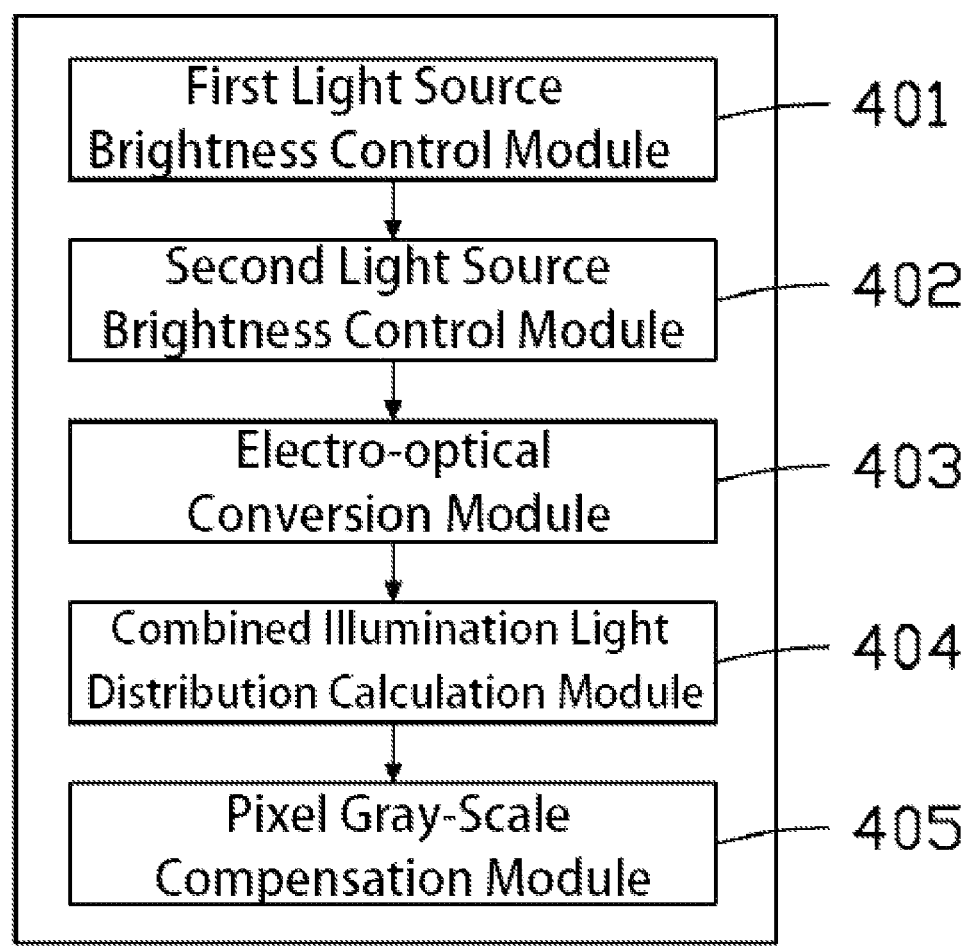
FIG. 5 is a diagram of software modules executed by a processing assembly of the projection system shown in FIG. 1.

Referring to FIG. 5, when the projection system 100 is operating, the processing unit 4 executes the software modules so as to generate control signals for controlling the first light source 1, the second light source 2 and the spatial light modulators 51, 51a. The software modules are stored in the storage unit 6 and invoked by the processing unit 4. The software modules include a first light source brightness controlling module 401 and a second light source brightness controlling module 402. The first light source brightness controlling module 401 is configured to generate a brightness distribution signal (hereinafter referred to as "brightness distribution signal of the first light source") corresponding to the illumination regions of the first light source 1 at least according to the pixel gray scale signal of an image frame to be projected and the maximum brightness of the first light source 1, and output the brightness distribution signal of the first light source to the illumination regions of the first light source 1, so as to generate a first illumination light field. In an embodiment of the present disclosure, the first light source brightness controlling module 401 generates the brightness distribution signal of the first light source according to the brightness distribution signal (hereinafter referred to as "image brightness distribution signal") corresponding to the pixel gray scale signal of the image frame to be projected and the maximum brightness of the first light source 1. The second light source brightness controlling module 402 is configured to generate a brightness distribution signal (hereinafter referred to as the "brightness distribution signal of the second light source") for controlling the light steering element 22 according to the pixel gray scale signal of the image frame and the brightness distribution signal of the first light source, to control the light steering element 22 to generate a second illumination light field. The first illumination light field and the second illumination light field are combined at the light combination device 32 to generate a combined light field.

In an embodiment of the present disclosure, the second light source brightness controlling module 402 calculates a remaining illumination light distribution according to a difference between the image brightness distribution signal and the brightness distribution signal of the first light source, and then generates the brightness distribution signal of the second light source according to the remaining illumination light distribution.

Further, the software module further includes an electro-optical conversion module 403. The electro-optical conversion module 403 is configured to convert the pixel gray scale signal of the image frame into the image brightness distribution signal. The image brightness distribution signal is transmitted to the first light source brightness controlling module 401 and the second brightness control module 402, so as to enable the first light source brightness controlling module 401 and the second brightness control module 402 to generate the brightness distribution signal of the first light source and the brightness distribution signal of the second light source, respectively. The electro-optical conversion module 403 implements the above-mentioned functions according to an electro-optical conversion function (EOTF). The electro-optical conversion function is generated according to characteristics of post-production and image signals, such as PQ function, HLG function, and conversion function dynamically generated according to the image content.

Further, the software modules further include a combined illumination light distribution calculation module 404 and a pixel gray scale compensation module 405. The combined illumination light distribution calculation module 404 is configured to calculate a combined brightness distribution signal (hereinafter referred to as "total brightness distribution signal") according to the brightness distribution signal of the first light source and the brightness distribution signal of the second light source. The pixel gray scale compensation module 405 is configured to compensate the pixel gray scale signal of the image frame according to the difference between the image brightness distribution signal and the total brightness distribution signal, so as to generate and output an image signal to the spatial light modulators 51, 51a.

It is appreciated that the brightness of the light-emitting unit 21 of the second light source 2 may be configured as adjustable or non-adjustable. When the brightness of the light-emitting unit 21 is adjustable, the processing unit 4 may further adjust the brightness of the light-emitting unit 21 according to brightness requirements on the image frame to be projected. The process may include: the second light source brightness controlling module generates a brightness control signal corresponding to the light-emitting unit 21 according to the brightness distribution signal of the second light source, so as to adjust the brightness of the light-emitting unit 21 according to the brightness required for the light steering element 22.

It is appreciated that, due to characteristics of the light steering element 22, the light steering element 22 may not concentrate all light energy to the region which needs to be brightened. On the contrary, other regions that do not need to be brightened may also have a certain amount of residual brightness (hereinafter referred to as "retention brightness"). In view of this, in an embodiment of the present disclosure, the first light source brightness controlling module 401 is configured to determine a light dimming region and a light increasing region of the light steering element 22 according to the pixel gray scale signal of the image frame (may be according to the image brightness distribution signal) and the maximum brightness of the first light source, and generate a brightness distribution signal of the first light source according to the pixel gray scale signal of the image frame (may be according to the image brightness distribution signal), the maximum brightness of the first light source, and the retention brightness of the light dimming region of the light steering element 22.

In an embodiment of the present disclosure, the first light source brightness controlling module 401 is configured to generate a prepositive brightness distribution signal according to the pixel gray scale signal of the image frame (may be according to the image brightness distribution signal) and the maximum brightness of the first light source, and then calculate a difference between the prepositive brightness distribution signal and the retention brightness of the light dimming region of the light steering element 22, so as to obtain the brightness distribution signal of the first light source.

When the brightness of the light-emitting unit 21 is not adjustable, when the brightness increment of the light increasing region of the light steering element 22 has satisfied the requirements and the there is still residual light energy output by the light-emitting unit 21, the second light source brightness controlling module 402 is configured to determine the light dimming region and the light increasing region of the light steering element 22 according to the pixel gray scale signal of the image frame (may be according to the image brightness distribution signal) and the brightness distribution signal of the first light source, calculate the brightness increment required for the light increasing region, and calculate the brightness distribution of the light dimming region according to the light energy output by the light-emitting unit 21 and the brightness increment required for the light increasing region, so as to obtain the brightness distribution signal of the second light source.

In an embodiment of the present disclosure, the second light source brightness controlling module 402 is configured to distribute the remaining light energy evenly to each unit region of the light dimming region after satisfying the brightness increment required for the light increasing region.

Figure 6:
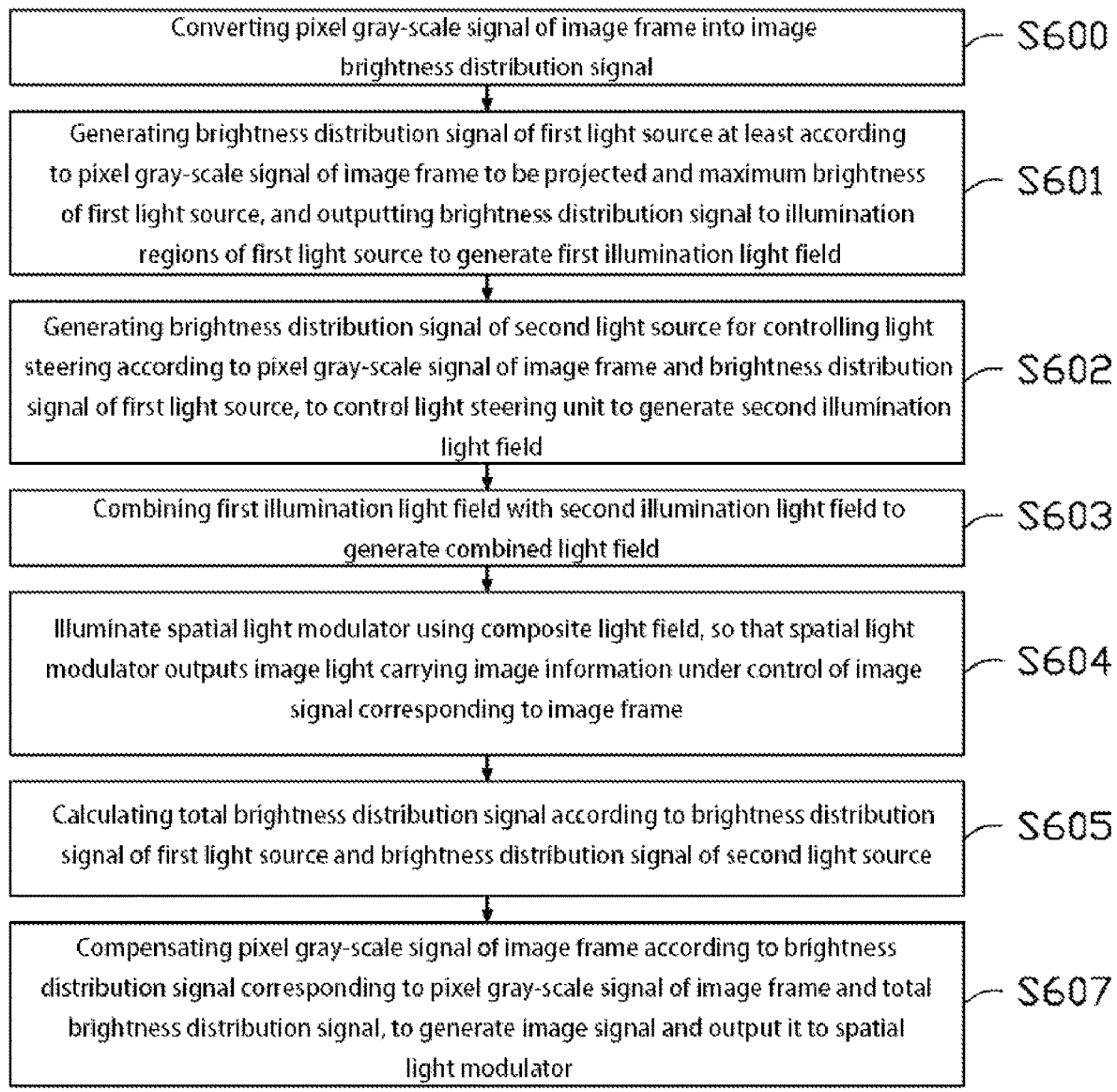
FIG. 6 is a flowchart of a projection display method according to an embodiment of the present disclosure.

Referring to FIG. 6, FIG. 6 is a flowchart of a projection display method according to an embodiment of the present disclosure. The method may be adopted in the projection system 100 described above. The projection display method is introduced below in conjunction with the projection system 100. The method includes following steps.

In step S601, a first light source brightness controlling module 401 generates a brightness distribution signal of the first light source at least according to the pixel gray scale signal of the image frame to be projected (may be according to the image brightness distribution signal) and a maximum brightness of a first light source 1, and outputs the brightness distribution signal of the first light source to a plurality of illumination regions of the first light source 1 so as to generate a first illumination light field.

In step S602, a second light source brightness controlling module 402 generates a brightness distribution signal of the second light source for controlling a light steering element 22 according to the pixel gray scale signal of the image frame (may be according to the image brightness distribution signal) and the brightness distribution signal of the first light source, so as to control the light steering element 22 to generate a second illumination light field.

In step S603, the light combination device 32 combines the first illumination light field and the second illumination light field to generate a combined light field. The light combination manner may be polarization combination, wavelength combination or spatial angle combination.

In step S604, optical processing assemblies 3, 3a continue to guide the combined light field to the spatial light modulators 51, 51a, the combined light field is used to illuminate the spatial light modulator 51, 51a, so that the spatial light modulators 51, 51a output image light carrying image information under the control of the image signal corresponding to the image frame.

It is appreciated that, in the process of guiding the combined light field to the spatial light modulators 51, 51a, the optical processing assemblies 3, 3a may also include processing such as wavelength conversion to the combined light field.

It is appreciated that, step S602 may further include: the second light source brightness controlling module 402 calculates the remaining illumination light distribution according to a difference between the image brightness distribution signal and the brightness distribution signal of the first light source, and generates the brightness distribution signal of the second light source for controlling the light steering element according to the remaining illumination light distribution.

It is appreciated that, before step S601, the method may further include step S600: an electro-optical conversion module 403 converts the pixel gray scale signal of the image frame into an image brightness distribution signal.

It is appreciated that, the method may further include step S605 and step S606. In step S605, a combined illumination light distribution calculation module 404 calculates a total brightness distribution signal according to the brightness distribution signal of the first light source and the brightness distribution signal of the second light source. In step S606, according to the brightness distribution signal and the total brightness distribution signal of the pixel gray scale signal corresponding to the image frame, a pixel gray scale compensation module 405 compensates the pixel gray scale signal of the image frame to generate the image signal, and output the image signal to the spatial light modulators 51,51a.

It is appreciated that, when the brightness of the light-emitting unit 21 is adjustable, the method may further include a following step: the second light source brightness controlling module generates a brightness control signal corresponding to the light-emitting unit 21 according to the brightness distribution signal of the second light source, so as to adjust the brightness of the light-emitting unit 21 according to the brightness required for the light steering element 22.

It is appreciated that, referring to FIG. 7, step S601 may further include the following steps.

In step S701, the first light source brightness controlling module 401 determines the light dimming region and the light increasing region of the light steering element 22 according to the pixel gray scale signal of the image frame (may be according to the image brightness distribution signal) and the maximum brightness of the first light source.

In step S702, the first light source brightness controlling module 401 generates the brightness distribution signal of the first light source according to the pixel gray scale signal of the image frame (may be according to the image brightness distribution signal), the maximum brightness of the first light source and the retention brightness of the light dimming region of the light steering element 22.

It is appreciated that referring to FIG. 8, step S702 may further include the following steps.

In step S801, the first light source brightness controlling module 401 generates a prepositive brightness distribution signal according to the pixel gray scale signal of the image frame (may be according to the image brightness distribution signal) and the maximum brightness of the first light source.

In step S802, the first light source brightness controlling module 401 calculates a difference between the prepositive brightness distribution signal and the retention brightness of the light dimming region of the light steering element 22 so as to obtain the brightness distribution signal of the first light source.

Figure 9:
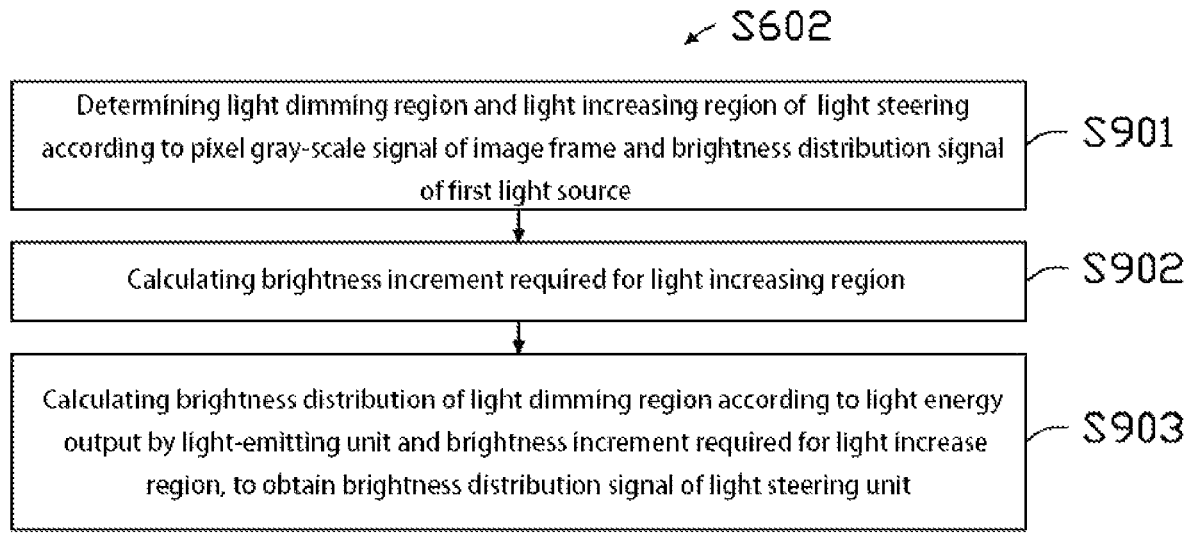
FIG. 9 is a sub-flowchart of the method shown in FIG. 6.

It is appreciated that referring to FIG. 9, step S602 may further include the following steps.

In Step S901, the second light source brightness controlling module 402 determines the light dimming region and light increasing region of the light steering element 22 according to the pixel gray scale signal of the image frame (may be according to the image brightness distribution signal) and the brightness distribution signal of the first light source.

In step S902, the second light source brightness controlling module 402 calculates the brightness increment required for the light increasing region.

In step S903, the second light source brightness controlling module 402 calculates the brightness distribution of the light dimming region according to the light energy output by the light-emitting unit 21 and the brightness increment required for the light increasing region, so as to obtain the brightness distribution signal of the first light source.

It is appreciated that step S903 may further include: distributing the remaining light energy evenly to each unit region of the light dimming region after satisfying the brightness increment required for the light increasing region.

In the projection system 100 of the present disclosure, the processing unit 4 receives the pixel gray scale signal of an image to be projected, and obtains a plurality of image partitions corresponds to a partitioned image of the illumination regions of the first light source 1. The processing unit 4 calculates the brightness of each image partition, and generates control signals of the first light source 1 and the second light source 2 corresponding to each image partition. The processing unit 4 controls the first light source 1 according to the control signal, so that the first light source 1 realizes the effect of regional illumination local dimming according to the image to be projected. The processing unit 4 controls the light steering element 22 of the second light source 2 to perform phase modulation or change the optical path difference so as to obtain an illumination light field with a bright-dark distribution. The processing unit 4 generates a compensation control signal according to the brightness distribution of the illumination light source after combination of the first light source 1 and the second light source 2 and the pixel gray scale signal of the image to be projected. The spatial light modulators 51, 51a modulate the corresponding brightness of the light beams emitted from the first light source 1 and the second light source 2 according to the compensated control signal so as to obtain image light, and then project a display image through the projection lens 52.

The present disclosure may greatly increase the peak brightness of the branch where the light steering element 22 is located via the regional illumination local dimming and light steering technology, and then superimpose a uniform light field so as to greatly increase the peak brightness of the image. The uniform illumination branch of the first light source 1 may increase the average brightness of the image.

Figure 10A:
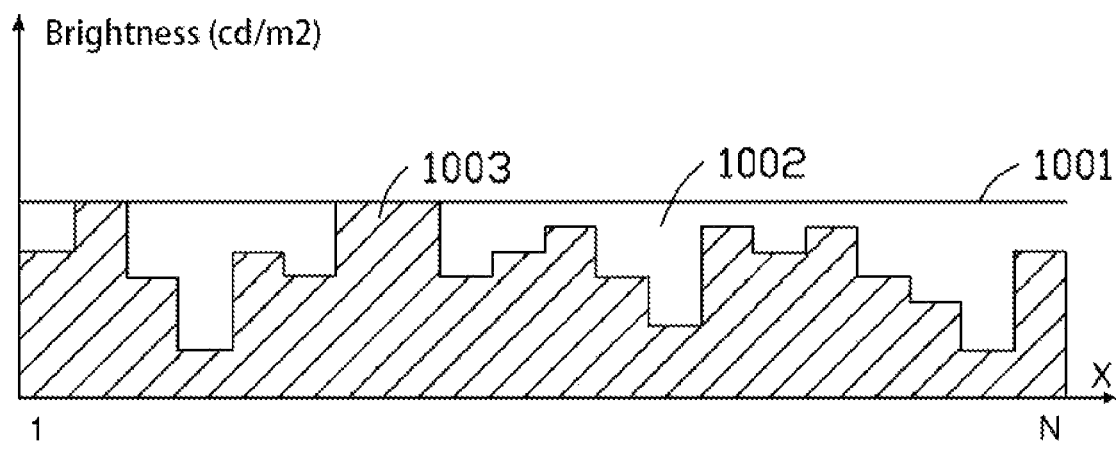
FIGS. 10A-10D are schematic diagrams showing light field brightness distribution presented by several different technologies.

Referring to FIGS. 10A to 10D, FIGS. 10A-10D are schematic diagrams showing light field brightness distribution that may be presented by, alone or in combination, regional illumination local dimming and light steering technologies. FIG. 10A shows the brightness distribution that may be achieved by light field modulation using regional illumination local dimming technology. Reference sign 1001 represents the maximum brightness that the projection system 100 may achieve when a uniform color image is displayed. Reference sign 1002 is a dimming ratio of various regions. Reference sign 1003 is the brightness distribution of various regions after dimming. It may be seen that the regional illumination local dimming technology may not break through the brightness at a uniform white field, and the peak brightness of the image is equal to the maximum brightness at the white field. Through local dimming, only light leakage in the dark field of the image may be reduced, so that the brightness of the black region is reduced, thereby achieving the purpose of contrast increasing.

Figure 10B:
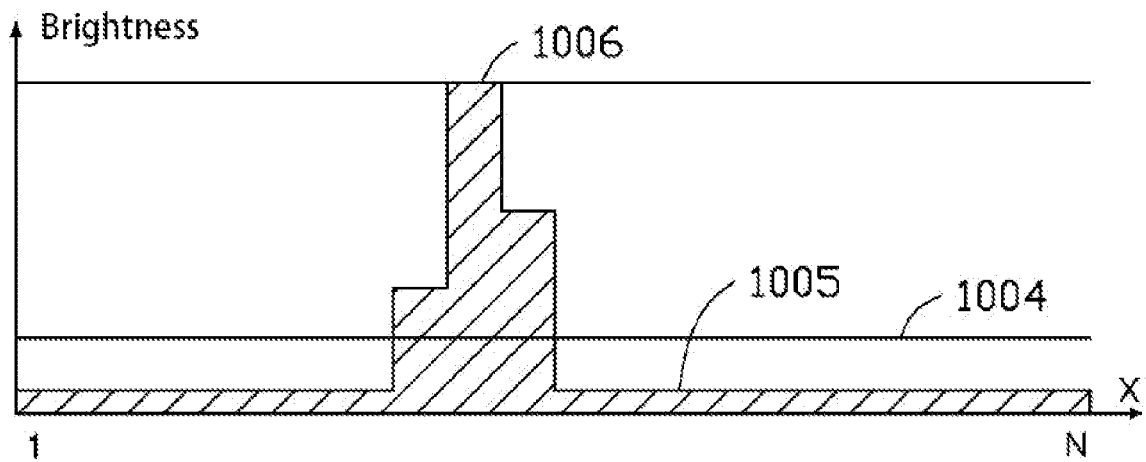

FIG. 10B is a schematic diagram of the brightness distribution of the light steering technology. Reference sign 1004 indicates the maximum brightness when the projection system 100 displays a uniform white field by using the light steering technology alone. Since the light steering technology may control the spatial brightness distribution of the output light field, it may guide illumination light of the dark field in the image to the bright field. Therefore, the peak brightness that the light-guided technology may achieve is much greater than the brightness when a uniform white field is displayed, as shown by reference sign 1006. reference sign 1005 represents the remaining brightness of other regions. However, the light steering technology may not increase the total lumens output by the projection system 100, i.e., the total lumens of the image are constant. Therefore, the darker the dark field in the image, the smaller the proportion of the bright field, then the higher the peak brightness, the higher the contrast. In the case where most of the pixels in the image have bright field or mid-gray brightness, the light steering technology has to separate most of the lumens to illuminate the mid-gray and darker regions, so that the lumens used for peak brightness pixels are insufficient, thereby limiting the maximum brightness (peak brightness) of light steering technology in general application scenarios.

Figure 10C:
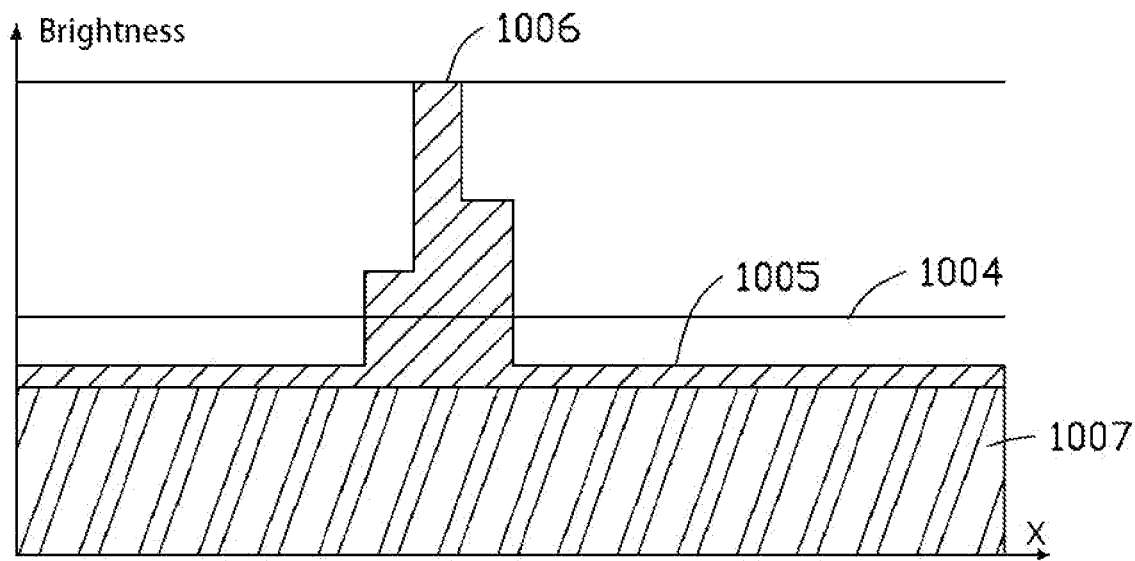

In addition, due to the limitation of the light steering element, the light flux that may generally be withstood is not large. In order to increase the total lumens of the image, a uniformly illuminated supplementary light field 1007 is added on the basis of the light steering technology, as shown in FIG. 10C. The brightness of the mid-gray and darker pixels in the image is mainly provided by a uniform supplementing light field. The light steering element may concentrate most of lights that may be directed and controlled to vicinity of the pixels at the peak brightness, so that it may be displayed in very high peak brightness in most scenarios. However, due to the addition of the uniform illumination light field, the illumination light of the black field in the image is greatly increased, so that the light leakage upon the black field is aggravated and the brightness of the black pixels in the image is increased, thereby reducing the contrast that the image may achieve.

Figure 10D:
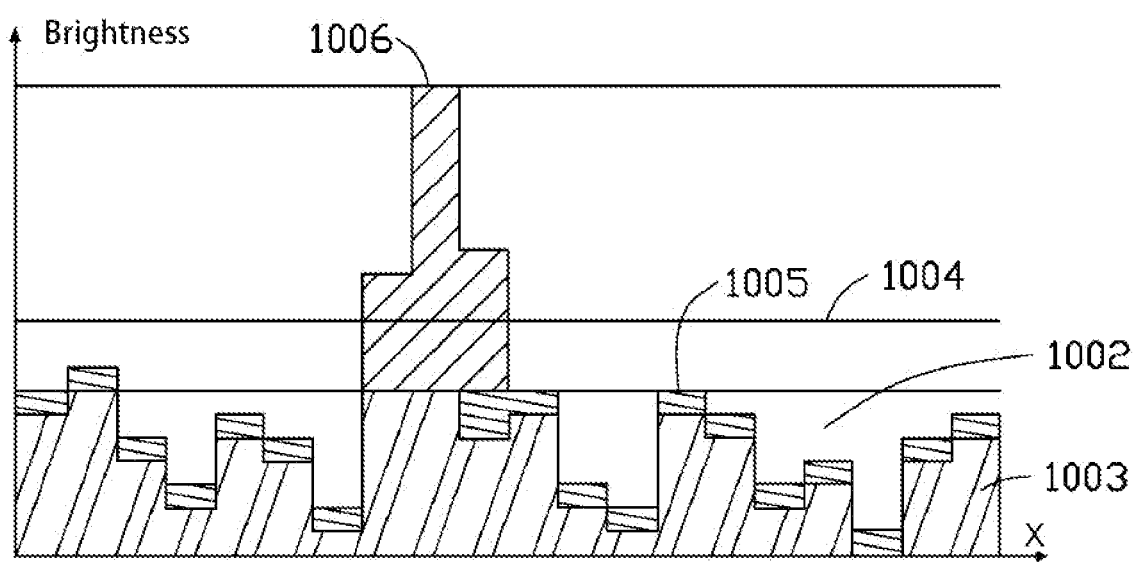

FIG. 10D is a schematic diagram of the brightness spatial distribution after the combination of the light steering technology and the regional illumination local dimming technology provided in the embodiments of the present disclosure, that is a superimposed technical effect of FIG. 10A and FIG. 10B. Illumination of the mid-gray and low-brightness pixels in the image is achieved firstly by a low-frequency illumination light field from the local dimming technology. Then, for the pixels that exceed the maximum brightness of the local dimming light source, light is supplemented by the light field distributed through the light steering technology, so that the purpose of reducing the brightness of the black field and increasing the peak brightness, thereby achieving better results than using these two technologies alone.

In summary, the projection system provided by the present disclosure adopts two illumination light sources to generate the first illumination light field and the second illumination light field. The first illumination light field uses the regional illumination local dimming technology to generate background illumination light with a bright-dark distribution according to contents of the image. The second illumination light field uses light steering technology to generate another illumination light with a bright-dark distribution. The first illuminating light and the second illuminating light are combined in front of the spatial light modulator to generate a combined illumination light field to illuminate the spatial light modulator, so that the purpose of simultaneously increasing the peak brightness of the image and reducing brightness of the black field of the image is achieved, thereby increasing the sequence and intra-frame contrast of the projection system to achieve the functions of high-brightness and high dynamic range of the image.

For those skilled in the art, it is obvious that the present disclosure is not limited to details of the foregoing exemplary embodiments, and the present disclosure may be implemented in other forms without departing from the spirit or basic characteristics of the present disclosure. Therefore, from any point of view, the embodiments should be regarded as exemplary and non-limiting. The scope of the present disclosure is defined by the appended claims rather than the above description, and therefore all changes within the meaning and scope of the equivalent elements to the claims are intended to be included in the present disclosure. Any reference signs in the claims should not be regarded as limiting the claims involved. In addition, it is obvious that the word "including" does not exclude other units or steps, and a singular form does not exclude a plural form. A plurality of units or devices stated in the device claims may also be implemented by the same unit or device through software or hardware.

The above are only embodiments of the present disclosure, and do not limit the scope of the present disclosure. Any equivalent structure or equivalent process transformation made by using the contents of the description and drawings of the present disclosure, or directly or indirectly applied to other related art, are included in the protection scope of the present disclosure.

What is claimed is:

1. A projection system, comprising:
 a first light source, wherein the first light source is an array light source, the first light source is divided into a plurality of illumination regions, and each of the plurality of illumination regions is separately controllable so that the first light source generates a first illumination light field with adjustable brightness;
 a second light source, wherein the second light source comprises a light-emitting unit and a light steering element, the light steering element is configured to redistribute illumination light emitted from the light-emitting unit to generate a second illumination light field with adjustable brightness, and the second illumination light field superimposes the first illumination light field to generate a combined light field;
a processing unit, wherein software modules executed by the processing unit comprise:
a first light source brightness control module configured to generate a brightness distribution signal corresponding to the illumination regions of the first light source at least based on a pixel gray scale signal of an image frame to be projected and a maximum brightness of the first light source, and output the brightness distribution signal to the illumination regions of the first light source so as to generate the first illumination light field; and
a second light source brightness controlling module configured to generate a brightness distribution signal for controlling the light steering element according to the pixel gray scale signal of the image frame and the brightness distribution signal corresponding to the illumination regions of the first light source so as to control the light steering element to generate the second illumination light field; and
a spatial light modulator, wherein the spatial light modulator is configured to modulate the combined light field based on an image signal output from the processing unit so as to generate image light carrying image information.

2. The projection system according to claim 1, wherein the light steering element is phase modulation liquid crystal or a deformable mirror.

3. The projection system according to claim 1, wherein the second light source brightness control module is configured to calculate a remaining illumination light distribution according to a difference between a brightness distribution signal corresponding to the pixel gray scale signal of the image frame and the brightness distribution signal corresponding to the illumination regions of the first light source, and generate the brightness distribution signal for controlling the light steering element according to the remaining illumination light distribution.

4. The projection system according to claim wherein the software modules executed by the processing unit further comprise: an electro-optical conversion module configured to convert the pixel gray scale signal of the image frame into a corresponding brightness distribution signal.

5. The projection system according to claim 1, wherein the software modules executed by the processing unit further comprise:
a combined illumination light distribution calculation module configured to calculate a combined brightness distribution signal according to the brightness distribution signal corresponding to the illumination regions of the first light source and the brightness distribution signal corresponding to the light steering element; and
a pixel gray scale compensation module configured to compensate the pixel gray scale signal of the image frame according to the brightness distribution signal corresponding to the pixel gray scale signal of the image frame and the combined brightness distribution signal, so as to generate the image signal and output the image signal to the spatial light modulator.

6. The projection system according to claim wherein a brightness of the light-emitting unit of the second light source is adjustable, and the second light source brightness controlling module is further configured to generate a brightness control signal corresponding to the light-emitting unit according to the brightness distribution signal of the light steering element, so as to adjust the brightness of the light-emitting unit according to a brightness required for the light steering element.

7. The projection system according to claim wherein the first light source brightness controlling module is configured to determine a light dimming region and a light increasing region of the light steering element according to the pixel gray scale signal of the image frame and the maximum brightness of the first light source, and generate the brightness distribution signal of the illumination regions of the first light source according to the pixel gray scale signal of the image frame, the maximum brightness of the first light source, and a retention brightness of the light dimming region of the light steering element.

8. The projection system according to claim 7, wherein the first light source brightness control module is configured to generate a prepositive brightness distribution signal according to the pixel gray scale signal of the image frame and the maximum brightness of the first light source, and then calculate a difference between the prepositive brightness distribution signal and the retention brightness of the light dimming region of the light steering element, so as to obtain the brightness distribution signal corresponding to the illumination regions of the first light source.

9. The projection system according to claim wherein the second light source brightness control module is configured to determine a light dimming region and a light increase region of the light steering element and calculate brightness increment required for the light increasing region according to the pixel gray scale signal of the image frame and the brightness distribution signal corresponding to the illumination regions of the first light source, and calculate a brightness distribution of the light dimming region according to light energy output by the light-emitting unit and the brightness increment required for the light increasing region, so as to obtain the brightness distribution signal of the light steering element.

10. The projection system according to claim 9, wherein the second light source brightness controlling module is configured to distribute remaining light energy evenly to each unit region of the light dimming region after satisfying the brightness increment required for the light increasing region.

11. A projection display method, comprising:
generating a brightness distribution signal corresponding to a plurality of illumination regions of a first light source at least according to a pixel gray scale signal of an image frame to be projected and a maximum brightness of the first light source, and outputting the brightness distribution signal to the plurality of illumination regions of the first light source so as to generate a first illumination light field;
generating a brightness distribution signal for controlling a light steering element according to the pixel gray scale signal of the image frame and the brightness distribution signal corresponding to the plurality of illumination regions of the first light source so as to control the light steering element to generate a second illumination light field;
combining the first illumination light field with the second illumination light field to generate a combined light field; and
illuminating a spatial light modulator using the combined light field, so that the spatial light modulator outputs image light carrying image information under control of an image signal corresponding to the image frame.

12. The projection display method according to claim 11, wherein generating the brightness distribution signal for controlling the light steering element comprises: calculating a remaining illumination light distribution according to a difference between the brightness distribution signal corresponding to the pixel gray scale signal of the image frame and the brightness distribution signal corresponding to the illumination regions of the first light source, and generating the brightness distribution signal for controlling the light steering element according to the remaining illumination light distribution.

13. The projection display method according to claim 11, further comprising: converting the pixel gray scale signal of the image frame into the corresponding brightness distribution signal.

14. The projection display method according to claim 13, further comprising: calculating a combined brightness distribution signal according to the brightness distribution signal corresponding to the illumination regions of the first light source and the brightness distribution signal corresponding to the light steering element;

compensating the pixel gray scale signal of the image frame according to the brightness distribution signal corresponding to the pixel gray scale signal of the image frame and the combined brightness distribution signal, to generate the image signal; and outputting the image signal to the spatial light modulator.

15. The projection display method according to claim 11, further comprising: generating a brightness control signal of a light-emitting unit for illuminating the light steering element according to the brightness distribution signal of the light steering element so as to adjust the light-emitting unit according to a brightness required for the light steering element.

16. The projection display method according to claim 11, wherein generating the brightness distribution signal corresponding to a plurality of illumination regions of the first light source comprises:

determining a light dimming region and a light increasing region of the light steering element according to the pixel gray scale signal of the image frame and the maximum brightness of the first light source; and generating the brightness distribution signal of the illumination regions of the first light source according to the pixel gray scale signal of the image frame, the maximum brightness of the first light source, and a retention brightness of the light dimming region of the light steering element.

17. The projection display method according to claim 16, wherein generating the brightness distribution signal of the illumination regions of the first light source according to the pixel gray scale signal of the image frame, the maximum brightness of the first light source, and the retention brightness of the light dimming region of the light steering element comprises:

generating a prepositive brightness distribution signal according to the pixel gray scale signal of the image frame and the maximum brightness of the first light source; and calculating the brightness distribution signal corresponding to the illumination regions of the first light source according to a difference between the prepositive brightness distribution signal and the retention brightness of the light dimming region of the light steering element.

18. The projection display method according to claim 12, wherein generating the brightness distribution signal of the light steering element comprises:

determining a light dimming region and a light increasing region of the light steering element according to the pixel gray scale signal of the image frame and the brightness distribution signal corresponding to the illumination regions of the first light source;

calculating brightness increment required for the light increasing region; and calculating a brightness distribution of the light dimming region according to light energy output from a light-emitting unit illuminating the light steering element and the brightness increment required for the light increasing region, so as to obtain the brightness distribution signal of the light steering element.

19. The projection display method according to claim 18, wherein calculating the brightness distribution of the light dimming region comprises: distributing remaining light energy evenly to each unit region of the light dimming region after satisfying the brightness increment required for the light increasing region.

20. The projection display method according to claim 11, wherein combining the first illumination light field with the second illumination light field comprises: polarization combination, wavelength combination, or spatial angle combination.

* * * * *

UNITED STATES PATENT AND TRADEMARK OFFICE
CERTIFICATE OF CORRECTION

PATENT NO. : 11,448,949 B2  
APPLICATION NO. : 17/277884  
DATED : September 20, 2022  
INVENTOR(S) : Xin Yu et al.

Page 1 of 1

It is certified that error appears in the above-identified patent and that said Letters Patent is hereby corrected as shown below:

In the Claims

Column 17, Line 62, Claim 6 insert --1-- after "claim"  
Column 18, Line 4, Claim 8 insert --1-- after "claim"  
Column 18, Line 26, Claim 9 insert --1-- after "claim"

Signed and Sealed this  
Twenty-ninth Day of November, 2022

Katherine Kelly Vidal  
*Director of the United States Patent and Trademark Office*